US012782570B2

(12) United States Patent
Liu

(10) Patent No.: US 12,782,570 B2
(45) Date of Patent: Nov. 3, 2026

(54) OPTICAL TRACKING DEVICE

(71) Applicant: PixArt Imaging Inc., Hsin-Chu City (TW)

(72) Inventor: Feng-Chi Liu, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 36 days.

(21) Appl. No.: 19/089,034

(22) Filed: Mar. 25, 2025

(65) Prior Publication Data

US 2026/0299128 A1 Oct. 1, 2026

(51) Int. Cl.

| | |
|---|---|
| ***G01S 17/66*** | (2006.01) |
| ***G01S 17/89*** | (2020.01) |
| ***G06T 7/246*** | (2017.01) |

(52) U.S. Cl.

CPC .............. *G01S 17/66* (2013.01); *G01S 17/89* (2013.01); *G06T 7/246* (2017.01); *G06T 2207/10028* (2013.01)

(58) Field of Classification Search

CPC ......... G01S 17/66; G01S 17/89; G06T 7/246; G06T 2207/10028

See application file for complete search history.

(56) References Cited

U.S. PATENT DOCUMENTS

2002/0043115 A1* 4/2002 Jin .......................... G01L 3/109 73/862.331
2017/0168591 A1* 6/2017 Chung .................... E05B 37/00
2021/0148771 A1* 5/2021 Spoor ........................ G01P 3/38
2021/0216149 A1* 7/2021 Liu ........................... G06F 3/02
2022/0076403 A1* 3/2022 Rutberg ............. G01D 5/34715

* cited by examiner

*Primary Examiner* — Dominic J Bologna
(74) *Attorney, Agent, or Firm* — Winston Hsu

(57) ABSTRACT

An optical tracking device includes a tracking module and a rotation shaft. The tracking module includes a light source and an optical sensor. The rotation shaft is disposed corresponding to the tracking module, and includes a central axis, an outer surface, and a first end and a second end opposite to each other. The central axis penetrates through centers of the first end and the second end, the outer surface is connected between the first end and the second end and facing the tracking module, and an included angle formed between a normal planar vector of at least a portion of the outer surface and an axial direction of the central axis is greater than or smaller than ninety degrees. An angle value of the included angle is designed based on a field of illumination of the light source.

18 Claims, 5 Drawing Sheets

OPTICAL TRACKING DEVICE

BACKGROUND OF THE INVENTION

1. Field of the Invention

The present invention relates to an optical tracking device, and more particularly, to an optical tracking device with preferred design flexibility.

2. Description of the Prior Art

With the advanced technology, the smart watch utilizes the optical sensing device to sense rotation of the watch crown. The conventional optical sensing device includes the cylindrical rotation member and the sensing module; each section of the cylindrical rotation member along the axial direction has the same cross-sectional size, and the cylindrical rotation member is connected to the watch crown. The sensing module emits the illumination beam to project onto the cylindrical rotation member, and receives the reflection beam from the cylindrical rotation member to identify the surface features on the cylindrical rotation member, so as to analyze the rotation behavior of the cylindrical rotation member and therefore determine the operation behavior applied by the user to the watch crown. However, the distance between the light emitter and the light receiver of the sensing module of the conventional optical sensing device, and the distance between the sensing module and the cylindrical rotation member cannot be further shortened due to the cylindrical structure of the rotation member, and the conventional optical sensing device is difficult to apply for the electronic product that requires the small and light appearance.

SUMMARY OF THE INVENTION

The present invention provides an optical tracking device with preferred design flexibility for solving above drawbacks.

According to the claimed invention, an optical tracking device includes a tracking module and a rotation shaft. The tracking module includes a light source and an optical sensor. The rotation shaft is disposed corresponding to the tracking module, and includes a central axis, an outer surface, and a first end and a second end opposite to each other. The central axis penetrates through centers of the first end and the second end, the outer surface is connected between the first end and the second end and facing the tracking module, and an included angle formed between a normal planar vector of at least a portion of the outer surface and an axial direction of the central axis is greater than or smaller than ninety degrees. An illumination beam emitted by the light source is reflected by the outer surface to project onto the optical sensor, an angle value of the included angle is designed based on a field of illumination of the light source.

According to the claimed invention, a minimal length between two reference points of the outer surface respectively on the first end and the second end is greater than a minimal length between two corresponding reference points of the central axis respectively on the first end and the second end; or, a distance of an edge of the first end relative to the central axis is smaller than a distance of an edge of the second end relative to the central axis; or, the outer surface is divided into a plurality of sections, a distance of each section relative to the tracking module is different from a distance of other section relative to the tracking module; or, the outer surface is divided into a plurality of sections, a distance of each section relative to the central axis is different from a distance of other section relative to the central axis.

According to the claimed invention, a section dimension of the first end is smaller than a section dimension of the second end, and a cross section of the rotation shaft along the axial direction is tapered. A difference between a section dimension of the first end and a section dimension of the second end is smaller than a preset value, and a section dimension of a middle section of the rotation shaft between the first end and the second end is smaller than the section dimension of the first end or the section dimension of the second end. The tracking module is disposed correspond to a position between the middle section and the first end or the second end.

According to the claimed invention, a distance between the light source and the optical sensor is inversely proportional to the angle value of the included angle. A distance between the tracking module and the rotation shaft is inversely proportional to the angle value of the included angle. A projection range of the rotation shaft onto the optical sensor is partly overlapped with a sensing surface of the optical sensor. A length of the projection range along the axial direction is between one third and one quarter of a surface width of the sensing surface along the axial direction.

According to the claimed invention, the optical tracking device further includes an operation processor electrically connected to the tracking module, the optical sensor acquires a sensing image relevant to the rotation shaft, and the operation processor analyzes the sensing image to determine a behavior of the rotation shaft. The operation processor analyzes a feature point of the sensing image to determine rotation of the rotation shaft. The operation processor analyzes intensity variation of the sensing image to determine relative motion between the rotation shaft and the tracking module.

According to the claimed invention, the outer surface is a flat surface or a curved surface, and the outer surface is a continuous surface or a non-continuous surface.

The optical tracking device of the present invention can include the rotation shaft designed as the structure with the inclined outer surface. The slope or the curvature of the outer surface of the rotation shaft can be inversely proportional to the distance between the light source and the optical sensor, so that the light source and the optical sensor can be designed to be closer for producing the small tracking module; the slope or the curvature of the outer surface of the rotation shaft can be further inversely proportional to the distance of the tracking module relative to the rotation shaft, allowing the rotation shaft to be more closer to the tracking module so that the electronic product to which the optical tracking device 10 is applied can have more spare internal configuration space. The optical tracking device of the present invention can have the rotation shaft with specific design, and have advantages of reducing the total volume of the tracking module and the optical tracking device and effectively sensing the rotation and the relative motion of the rotation shaft, and can be applied for a variety of different types of the electronic product and provide preferred market competitiveness.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
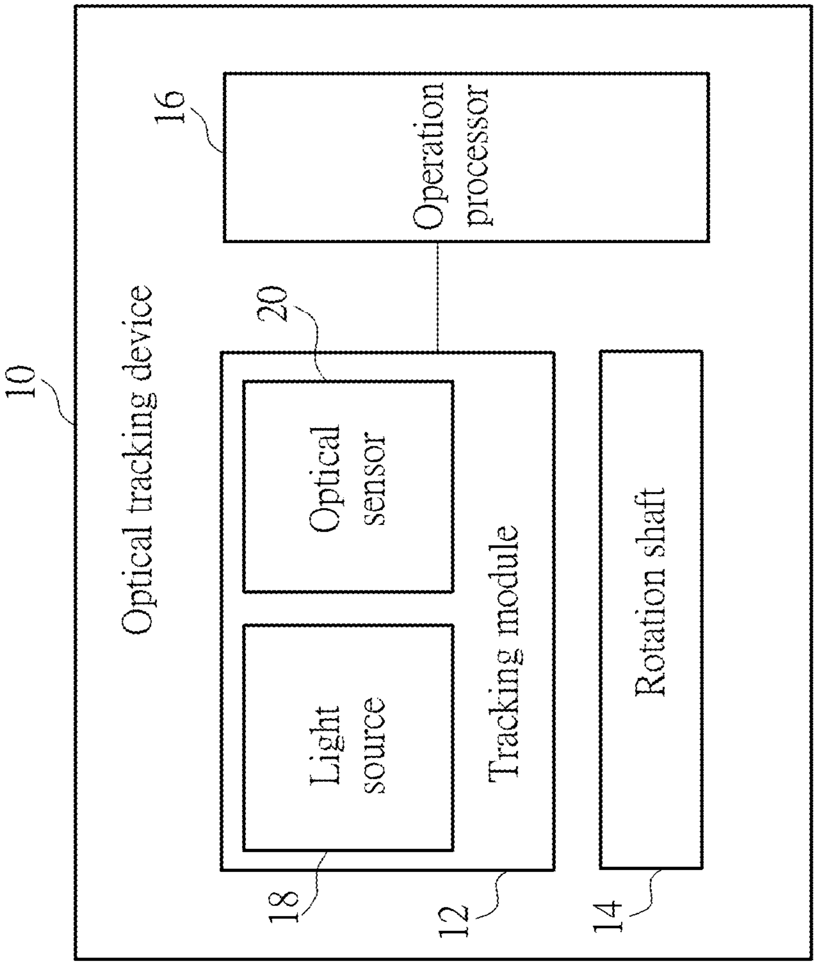
FIG. 1 is a functional block diagram of an optical tracking device according to an embodiment of the present invention.
Figure 2:
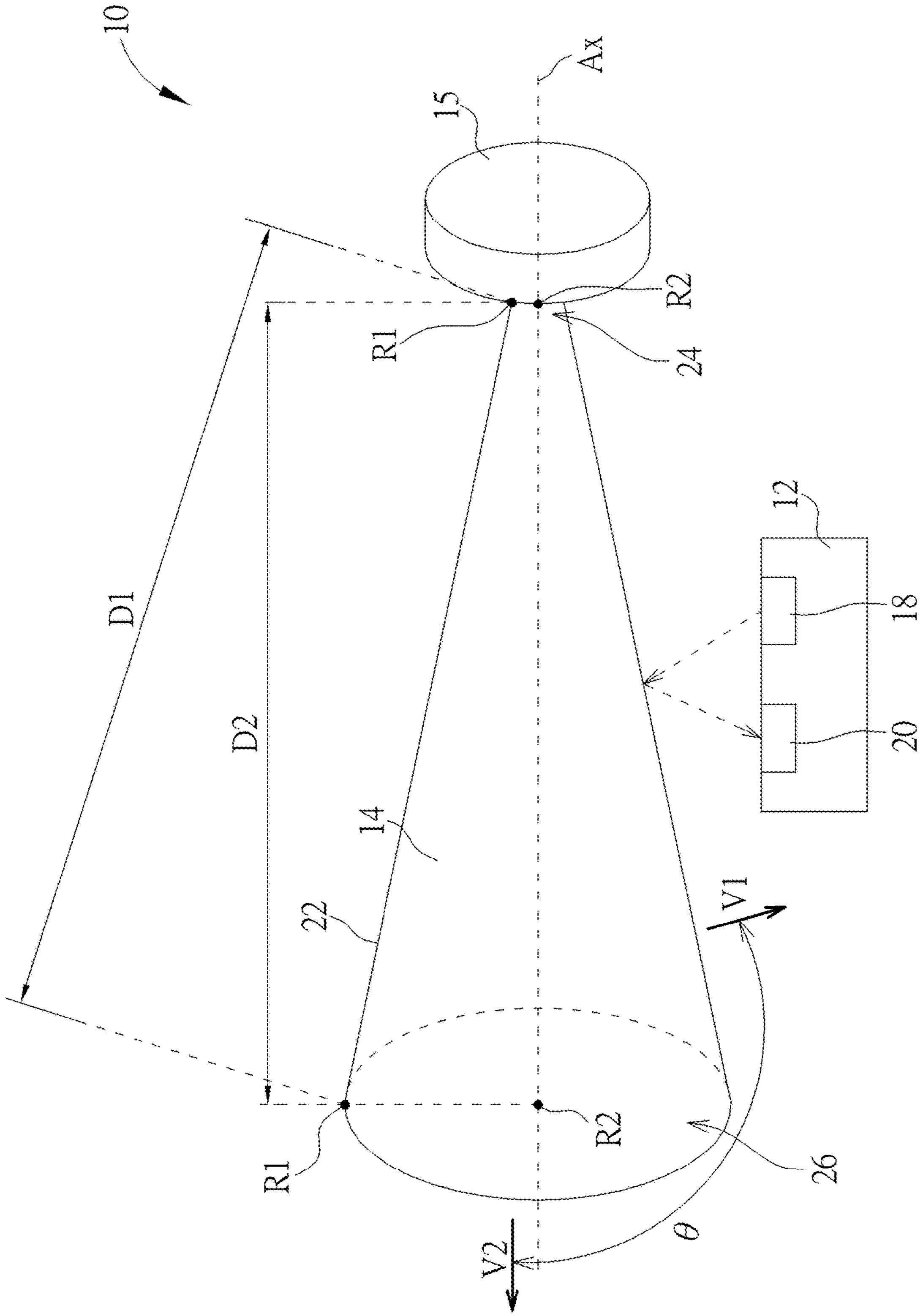
FIG. 2 and FIG. 3 are structural diagrams of the optical tracking device according to different embodiments of the present invention.
Figure 3:
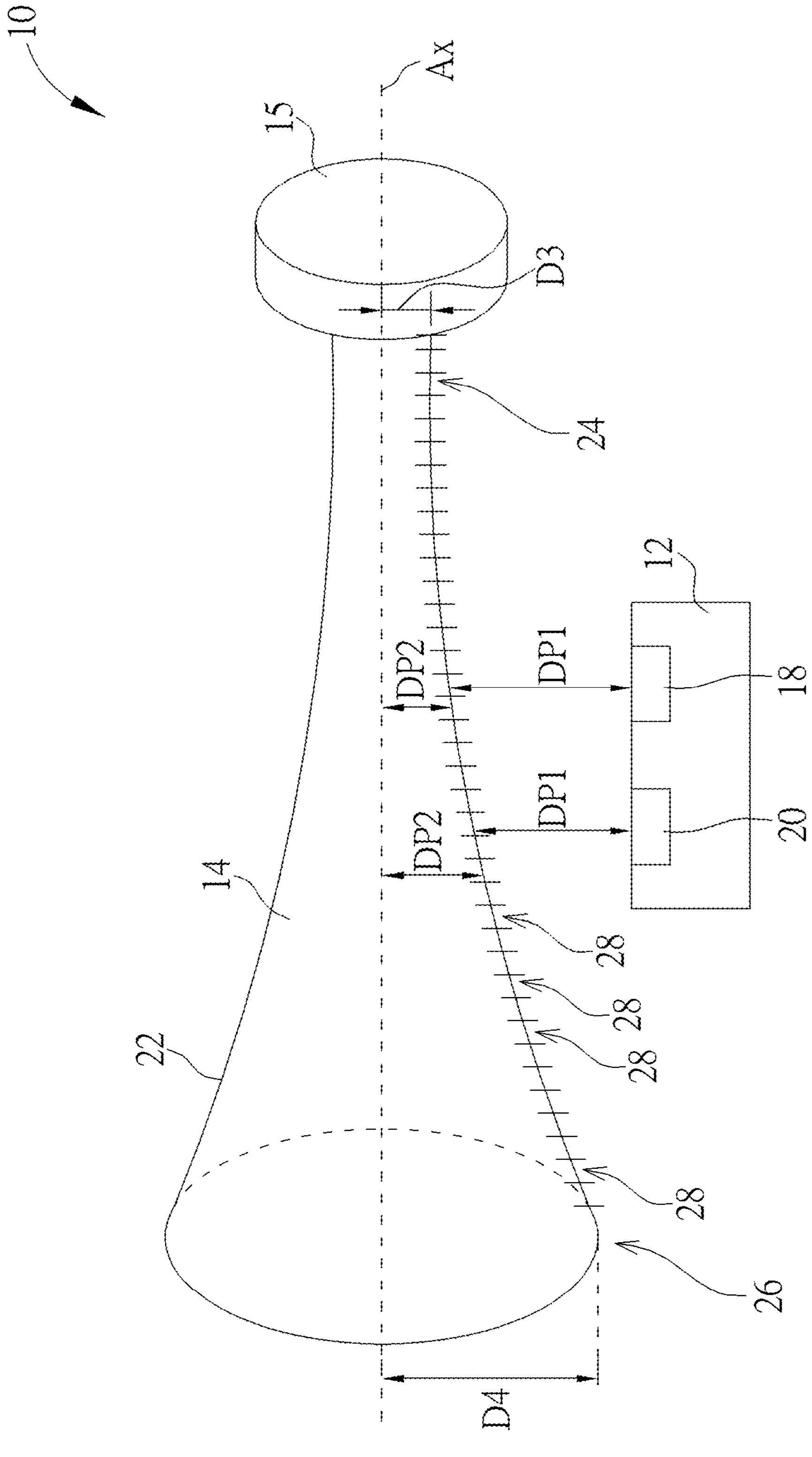

Please refer to FIG. 1 to FIG. 3. FIG. 1 is a functional block diagram of an optical tracking device 10 according to an embodiment of the present invention. FIG. 2 and FIG. 3 are structural diagrams of the optical tracking device 10 according to different embodiments of the present invention. The optical tracking device 10 can be used for rotation and shifting detection, and preferably applied to a smart watch; the optical tracking device 10 can have a smaller size due to specific structural design, further enabling the smart watch to have light and thin appearance design. In addition, the optical tracking device 10 of the present invention may be applied to a small electronic product, such as the air conditioning knob or the speaker volume knob, and may be further applied to a large electronic product, such as the electric vehicle; application of the optical tracking device 10 can depend on an actual demand, and a detailed description is omitted herein for simplicity.

The optical tracking device 10 can at least include a tracking module 12 and a rotation shaft 14. One end of the rotation shaft 14 can be connected to an operation element 15, and the other end of the rotation shaft 14 can be disposed adjacent to the tracking module 12. For example, if the optical tracking device 10 is applied to the smart watch, the air conditioning knob or the speaker volume knob, the operation element 15 next to the rotation shaft 14 can be a crown of the smart watch, or a control portion of the air conditioning knob and/or the speaker volume knob; if the optical tracking device 10 is applied to the electric vehicle, the rotation shaft 14 can be disposed on a wheel axle of the electric vehicle, and the operation element 15 next to the rotation shaft 14 can be an end of the wheel axle where the tire is mounted. Application of the operation element 15 is not limited to the foresaid embodiments, and depends on the actual demand.

The optical tracking device 10 can further include an operation processor 16 electrically connected to the tracking module 12. The tracking module 12 can include a light source 18 and an optical sensor 20. The light source 18 can emit an illumination beam to project onto the rotation shaft 14. The optical sensor 20 can receive the illumination beam reflected from the rotation shaft 14 to generate a sensing image relevant to the rotation shaft 14; the sensing image can be analyzed to acquire some parameters, such as position change of at least one feature point on the rotation shaft 14, and image intensity variation of the sensing image. The operation processor 16 can analyze the parameters of the sensing image to decide a behavior of the rotation shaft 14.

The rotation shaft 14 can include a central axis Ax, an outer surface 22, and a first end 24 and a second end 26 opposite to each other. A section dimension of the first end 24 can be preferably smaller than a section dimension of the second end 26, so that a cross section of the rotation shaft 14 along an axial direction V2 of the central axis Ax can be tapered or a similar type. The central axis Ax can penetrate through centers of the first end 24 and the second end 26, and the rotation shaft 14 can be rotated based on the central axis Ax. The outer surface 22 can be connected between the first end 24 and the second end 26. In rotation of the rotation shaft 14, parts of the rotation shaft 14 can turn and face towards the tracking module 12, and the operation processor 16 can analyze position change of the feature point and/or the image intensity variation of the sensing image relevant to the foresaid parts of the rotation shaft 14, so as to decide the behavior of the rotation shaft 14.

In the present invention, the optical tracking device 10 can provide the specific appearance of the rotation shaft 14 to be different from a conventional standard cylinder; for example, the rotation shaft 14 can be set as a tapered structure, or any structure with different sizes at opposite ends. The outer surface 22 between the first end 24 and the second end 26 of the rotation shaft 14 can be composed of a plurality of inclined planes with different slopes, or composed of the inclined plane with the single slope, as the embodiment shown in FIG. 2; further, the outer surface 22 may be composed of a plurality of curved surfaces with gradually varying curvatures, or composed of the curved surfaces with the same curvature, as the embodiment shown in FIG. 3. Actual variation of the outer surface 22 is not limited to the foresaid embodiments, and depends on a design demand. The outer surface 22 may include a plurality of areas; each of the plurality of areas can be a flat surface or a curved surface, and the plurality of areas can be continuous surfaces or non-continuous surfaces. An included angle θ formed between a normal planar vector V1 of at least a portion of the foresaid areas and the axial direction V2 of the central axis Ax can be greater than or smaller than ninety degrees, which means the normal planar vector V1 is not perpendicular to the axial direction V2.

From another perspective, the outer surface 22 can have two reference points R1 respectively located on the first end 24 and the second end 26, and the central axis Ax can further have two reference points R2 respectively located on the first end 24 and the second end 26 and corresponding to the reference points R1. Relation between the reference point R1 and the reference point R2 can be interpreted as: coordinates of the reference points R1 vertically projected onto the central axis Ax can be the same as coordinates of the reference points R2 on the central axis Ax. Therefore, a minimal length D1 between the two reference points R1 of the outer surface 22 can be greater than a minimal length D2 between the two corresponding reference points R2 of the central axis Ax. The line related to the minimal length D2 can be a horizontal straight line, and the line related to the minimal length D1 can be an inclined straight line, such as the embodiment shown in FIG. 2, and the line related to the minimal length D1 can be an inclined arced line, such as the embodiment shown in FIG. 3; actual application of the line type is not limited to the foresaid embodiments, and depends on the design demand.

In other interpretation, a distance D3 of an edge of the first end 24 relative to the central axis Ax can be smaller than an a distance D4 of an edge of the second end 26 relative to the central axis Ax, and the outer surface 22 between the first end 24 and the second end 26 can have the single slope, the gradually varying slope, the single curvature, or the gradually varying curvature. That is to say, the outer surface 22 can be divided into a plurality of sections 28, and a projection distance DP1 of each section 28 relative to the tracking module 12 can be different form a projection distance DP1 of other section 28 relative to the tracking module 12; or, a projection distance DP2 of each section 28 relative to the central axis Ax can be different form a projection distance DP2 of other section 28 relative to the central axis Ax.

As shown in FIG. 2 and FIG. 3, the illumination beam emitted by the light source 18 can be reflected from the outer surface 22 of the rotation shaft 14 to project onto the optical sensor 20; therefore, the optical tracking device 10 of the present invention can include the rotation shaft 14 designed as the tapered structure (or any similar structure), which can change a reflected direction of the illumination beam from the outer surface 22 to the optical sensor 20 by comparing with the conventional standard cylinder, so that a distance between the light source 18 and the optical sensor 20 can be closer, and the smaller tracking module 12 can be produced accordingly. Besides, the present invention can further shorten a distance between the tracking module 12 and the rotation shaft 14 due to the specific design of the rotation shaft 14, and the electronic product to which the optical tracking device 10 is applied can have more spare internal configuration space.

Figure 4:
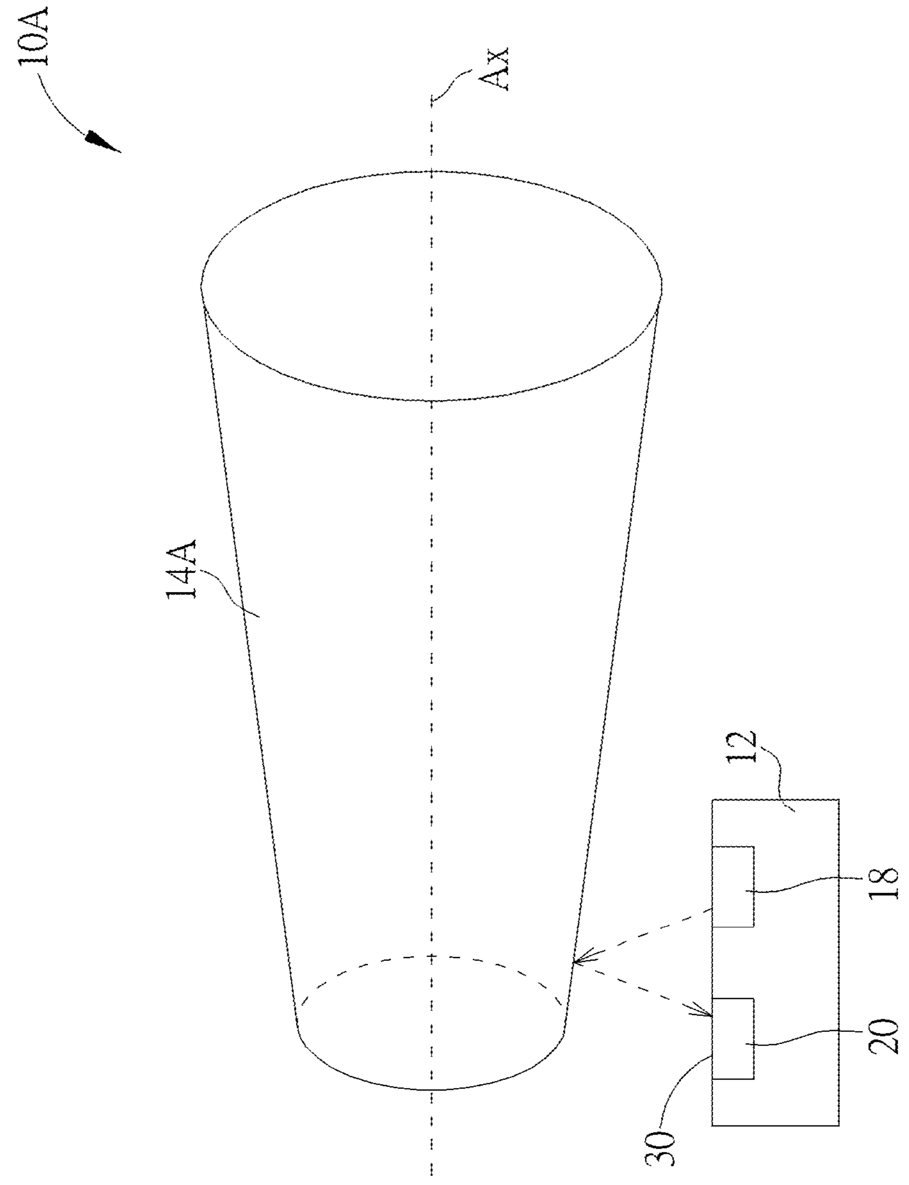
FIG. 4 is a structural diagram of the optical tracking device according to another embodiment of the present invention.

Please refer to FIG. 4. FIG. 4 is a structural diagram of the optical tracking device 10A according to another embodiment of the present invention. In the embodiment, elements having the same numerals as ones of the foresaid embodiment have the same structures and functions, and the detailed description is omitted herein for simplicity. The foresaid embodiment disposes the tracking module 12 between the first end 24 and the second end 26 of the rotation shaft 14, as shown in FIG. 2 and FIG. 3. In other possible embodiment, the tracking module 12 may be disposed on a lateral end of the rotation shaft 14A; for example, a projection range of the rotation shaft 14A of the optical tracking device 10A onto the optical sensor 20 can be partly overlapped with a sensing surface 30 of the optical sensor 20, as shown in FIG. 4. A length of the foresaid projection range along the axial direction Ax can be optionally set between one third and one quarter of a surface width of the sensing surface 30 along the axial direction Ax, so the present invention can further shorten the length of the rotation shaft 14A, thereby achieving the smaller optical tracking device 10A.

It should be mentioned that the present invention does not limit an actual value or change of the slope or the curvature of the outer surface 22 between the first end 24 and the second end 26 of the rotation shaft 14; the light source 18 can be a divergent light source, and the present invention can design an angle value (which may correspond to change of the slope or the curvature of the outer surface 22 between the first end 24 and the second end 26) of the included angle θ of the rotation shaft 14 in accordance with a field of illumination (FOI) of the light source 18. That is to say, the optical tracking device 10 can decide the slope or the curvature of the outer surface 22 of the rotation shaft 14 in accordance with the type of the light source 18, and can further select the type of the light source 18 and the slope or the curvature of the outer surface 22 of the rotation shaft 14 in accordance with a required size of the tracking module 12 and/or the internal configuration space required for the electronic product to which the optical tracking device 10 is applied.

In an actual operation of the optical tracking device 10, when the user rotates the operation element 15, the rotation shaft 14 can be guided for synchronous rotation; the tracking module 12 can capture the sensing image relevant to the rotation shaft 14, and the operation processor 16 can analyze the feature point inside the sensing image to determine whether the rotation shaft 14 is rotated based on the central axis Ax, and further determine a rotation angle and a rotation speed of the rotation shaft 14. When the user presses the operation element 15, the rotation shaft 14 can be shifted relative to the tracking module 12 (such as a direction from the right to the left shown in FIG. 2 and FIG. 3); meanwhile, a projection range of the illumination beam reflected from the outer surface 22 may be moved from a position of completely covering the optical sensor 20 to another position of partly covering the optical sensor 20 or another position of leaving the optical sensor 20. Therefore, the operation processor 16 can analyze intensity variation of the sensing image to determine relative motion between the rotation shaft 14 and the tracking module 12.

Figure 5:
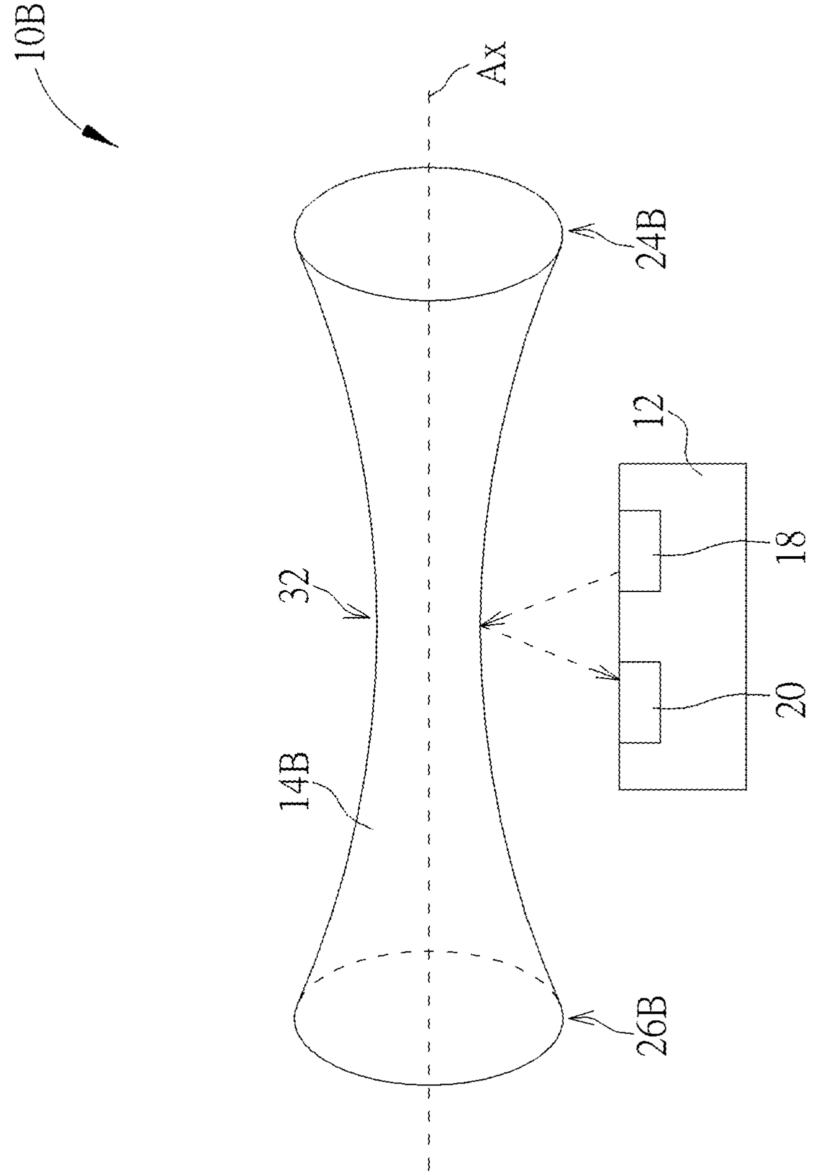
FIG. 5 is a structural diagram of the optical tracking device according to another embodiment of the present invention.

Please refer to FIG. 5. FIG. 5 is a structural diagram of the optical tracking device 10B according to another embodiment of the present invention. In the embodiment, elements having the same numerals as ones of the foresaid embodiment have the same structures and functions, and the detailed description is omitted herein for simplicity. The optical tracking device 10B can include the rotation shaft 14B with the first end 24B and the second end 26B having the same or similar section dimension, which means a difference between the section dimension of the first end 24B and the section dimension of the second end 26B can be smaller than a preset value, and a section dimension of a middle sections 32 between the first end 24B and the second end 26B of the rotation shaft 14B can be smaller than the section dimension of the first end 24B and/or the section dimension of the second end 26B. The preset value can be set in accordance with allowable tolerance of the rotation shaft 14B.

The rotation shaft 14B can be a structure that is wide at both ends and narrow in the middle, and can be applied for the wheel axle of the electric vehicle. The tracking module 12 of the optical tracking device 10B can be optionally disposed on a position corresponding to the middle sections 32 of the rotation shaft 14B, or on a position between the middle sections 32 and the first end 24B (or the second end 26B) of the rotation shaft 14B. When the electric vehicle moves forward or backward, the optical tracking device 10B can analyze the position change of the feature point on the sensing image relevant to the rotation shaft 14B, to determine the direction or the speed of the electric vehicle; the optical tracking device 10B can further analyze the intensity variation of the sensing image, for determining whether the rotation shaft 14B is shifted and then deciding whether the electric vehicle is turning.

In conclusion, the optical tracking device of the present invention can include the rotation shaft designed as the structure with the inclined outer surface. The slope or the curvature of the outer surface of the rotation shaft can be inversely proportional to the distance between the light source and the optical sensor, so that the light source and the optical sensor can be designed to be closer for producing the small tracking module; the slope or the curvature of the outer surface of the rotation shaft can be further inversely proportional to the distance of the tracking module relative to the rotation shaft, allowing the rotation shaft to be more closer to the tracking module so that the electronic product to which the optical tracking device 10 is applied can have more spare internal configuration space. Comparing to the prior art, the optical tracking device of the present invention can have the rotation shaft with specific design, and have advantages of reducing the total volume of the tracking module and the optical tracking device and effectively sensing the rotation and the relative motion of the rotation shaft, and can be applied for a variety of different types of the electronic product and provide preferred market competitiveness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical tracking device, comprising:

a tracking module comprising a light source and an optical sensor;

a rotation shaft disposed corresponding to the tracking module and comprising a central axis, an outer surface, and a first end and a second end opposite to each other, the central axis penetrating through centers of the first end and the second end, the outer surface being connected between the first end and the second end and facing the tracking module, an included angle formed between a normal planar vector of at least a portion of the outer surface and an axial direction of the central axis being greater than or smaller than ninety degrees;

wherein an illumination beam emitted by the light source is reflected by the outer surface to project onto the optical sensor, an angle value of the included angle is designed based on a field of illumination of the light source.

2. The optical tracking device of claim 1, wherein a minimal length between two reference points of the outer surface respectively on the first end and the second end is greater than a minimal length between two corresponding reference points of the central axis respectively on the first end and the second end.

3. The optical tracking device of claim 1, wherein a distance of an edge of the first end relative to the central axis is smaller than a distance of an edge of the second end relative to the central axis.

4. The optical tracking device of claim 1, wherein the outer surface is divided into a plurality of sections, a distance of each section relative to the tracking module is different from a distance of other section relative to the tracking module.

5. The optical tracking device of claim 1, wherein the outer surface is divided into a plurality of sections, a distance of each section relative to the central axis is different from a distance of other section relative to the central axis.

6. The optical tracking device of claim 1, wherein a section dimension of the first end is smaller than a section dimension of the second end.

7. The optical tracking device of claim 6, wherein a cross section of the rotation shaft along the axial direction is tapered.

8. The optical tracking device of claim 1, wherein a difference between a section dimension of the first end and a section dimension of the second end is smaller than a preset value, and a section dimension of a middle section of the rotation shaft between the first end and the second end is smaller than the section dimension of the first end or the section dimension of the second end.

9. The optical tracking device of claim 8, wherein the tracking module is disposed correspond to a position between the middle section and the first end or the second end.

10. The optical tracking device of claim 1, wherein a distance between the light source and the optical sensor is inversely proportional to the angle value of the included angle.

11. The optical tracking device of claim 1, wherein a distance between the tracking module and the rotation shaft is inversely proportional to the angle value of the included angle.

12. The optical tracking device of claim 1, wherein a projection range of the rotation shaft onto the optical sensor is partly overlapped with a sensing surface of the optical sensor.

13. The optical tracking device of claim 12, wherein a length of the projection range along the axial direction is between one third and one quarter of a surface width of the sensing surface along the axial direction.

14. The optical tracking device of claim 1, wherein the optical tracking device further comprises an operation processor electrically connected to the tracking module, the optical sensor acquires a sensing image relevant to the rotation shaft, and the operation processor analyzes the sensing image to determine a behavior of the rotation shaft.

15. The optical tracking device of claim 14, wherein the operation processor analyzes a feature point of the sensing image to determine rotation of the rotation shaft.

16. The optical tracking device of claim 14, wherein the operation processor analyzes intensity variation of the sensing image to determine relative motion between the rotation shaft and the tracking module.

17. The optical tracking device of claim 1, wherein the outer surface is a flat surface or a curved surface.

18. The optical tracking device of claim 1, wherein the outer surface is a continuous surface or a non-continuous surface.

* * * * *